United States Patent [19]
Takahama

[11] Patent Number: 6,119,184
[45] Date of Patent: Sep. 12, 2000

[54] ELECTRONIC EQUIPMENT AND ELECTRONIC EQUIPMENT SYSTEM

[75] Inventor: Shinichiro Takahama, Matsudo, Japan

[73] Assignee: Canon Kabushiki Kaisha, Tokyo, Japan

[21] Appl. No.: 08/925,614

[22] Filed: Sep. 9, 1997

[30] Foreign Application Priority Data

Sep. 10, 1996 [JP] Japan .................................. 8-239275

[51] Int. Cl.⁷ .................................................. G06F 13/00
[52] U.S. Cl. ........................ 710/101; 710/102; 710/103; 360/104; 360/105; 361/683; 361/686; 361/392
[58] Field of Search .................................... 395/281, 282, 395/283; 361/683, 686, 392; 710/101, 102, 103; 360/105, 104; 713/340

[56] References Cited

U.S. PATENT DOCUMENTS

| | | | |
|---|---|---|---|
| 5,107,400 | 4/1992 | Kobayashi | 361/392 |
| 5,175,671 | 12/1992 | Sasaki | 361/392 |
| 5,310,358 | 5/1994 | Johnson et al. | 439/358 |
| 5,313,596 | 5/1994 | Swindler et al. | 395/325 |
| 5,323,291 | 6/1994 | Boyle et al. | 361/683 |
| 5,386,567 | 1/1995 | Lien et al. | 395/700 |
| 5,493,376 | 2/1996 | Wasson et al. | 360/105 |
| 5,526,493 | 6/1996 | Shu | 710/101 |
| 5,535,093 | 7/1996 | Noguchi et al. | 361/686 |
| 5,552,959 | 9/1996 | Penniman et al. | 361/686 |
| 5,604,663 | 2/1997 | Shin et al. | 361/686 |
| 5,664,118 | 9/1997 | Nishigaki et al. | 395/283 |
| 5,737,541 | 4/1998 | Shimizu et al. | 395/281 |
| 5,930,517 | 7/1999 | Diehl et al. | 713/340 |

*Primary Examiner*—Ayaz R. Sheikh
*Assistant Examiner*—Frantz Blanchard Jean
*Attorney, Agent, or Firm*—Fitzpatrick, Cella, Harper & Scinto

[57] ABSTRACT

A locking system has a double locking mechanisms such that when a main body of an electronic equipment and an extension device are combined, an operability similar to that in case of using a single equipment is maintained and the combination is not separated at the time of carrying and which enables a more intelligent control by a built-in MPU and in which a high reliability is obtained. In an electronic equipment system in which a main body and an extension device are freely combined, an open-close-lever which is interlocked with movable claws is arranged on the side surface of the extension device, retaining holes to fix the movable claws are formed in the main body, an electronic locking unit comprising a mechanism having a cam portion adapted to lock the opening or closing of the lever and an electronic motor for making the cam operative is installed in the extension device. The movable claws couple and fix the main body and the extension device by closing the open-close-lever. At the time of the power-ON of the main body and extension device, an electronic locking acts, thereby disabling the locking to be released, and at the time of the power-OFF, the locking can be released. A connecting state between the electronic equipment and the extension device is discriminated from two sensors for detecting the opening/closing of the open-close-lever and the latching of the electronic locking.

28 Claims, 16 Drawing Sheets

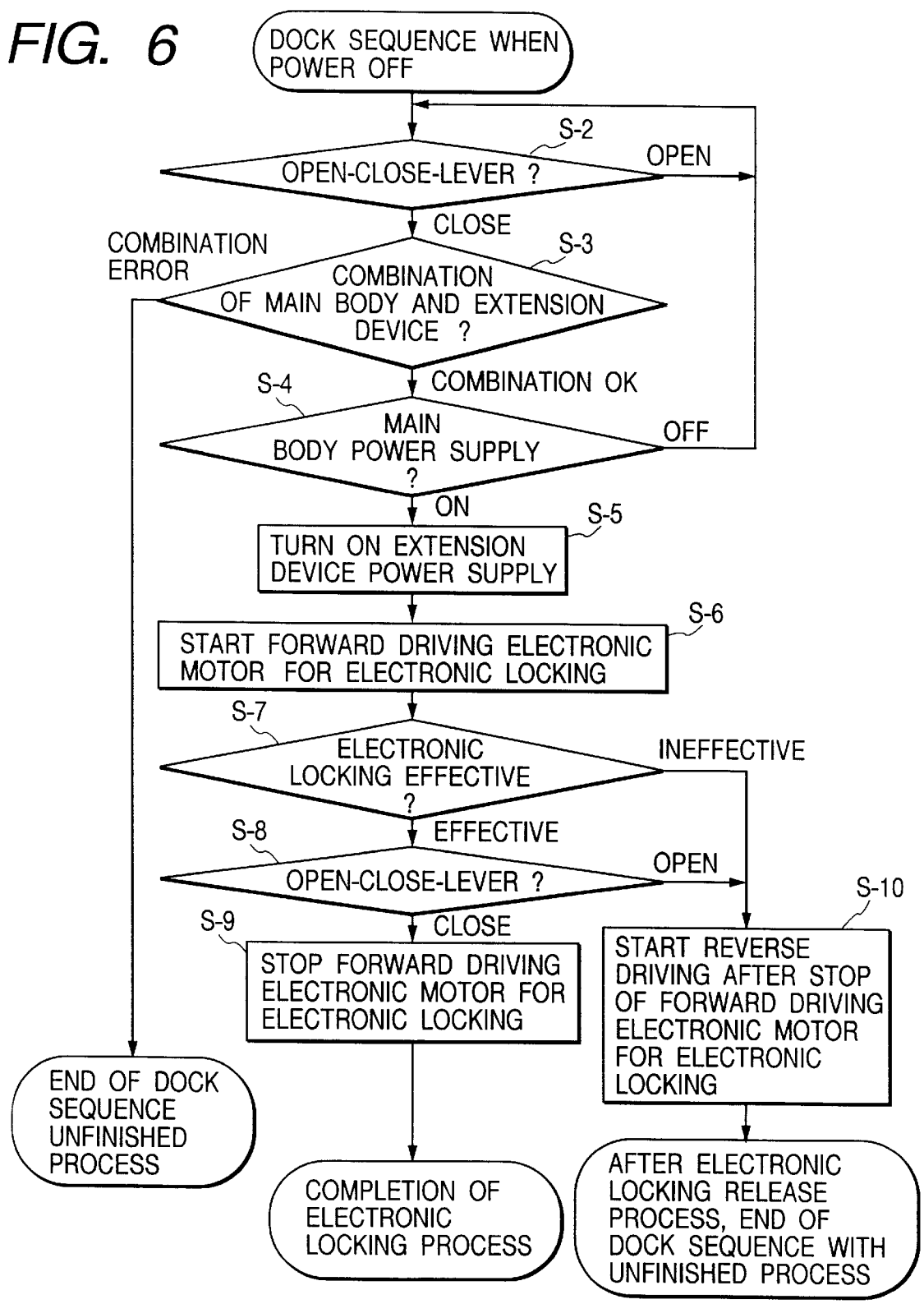

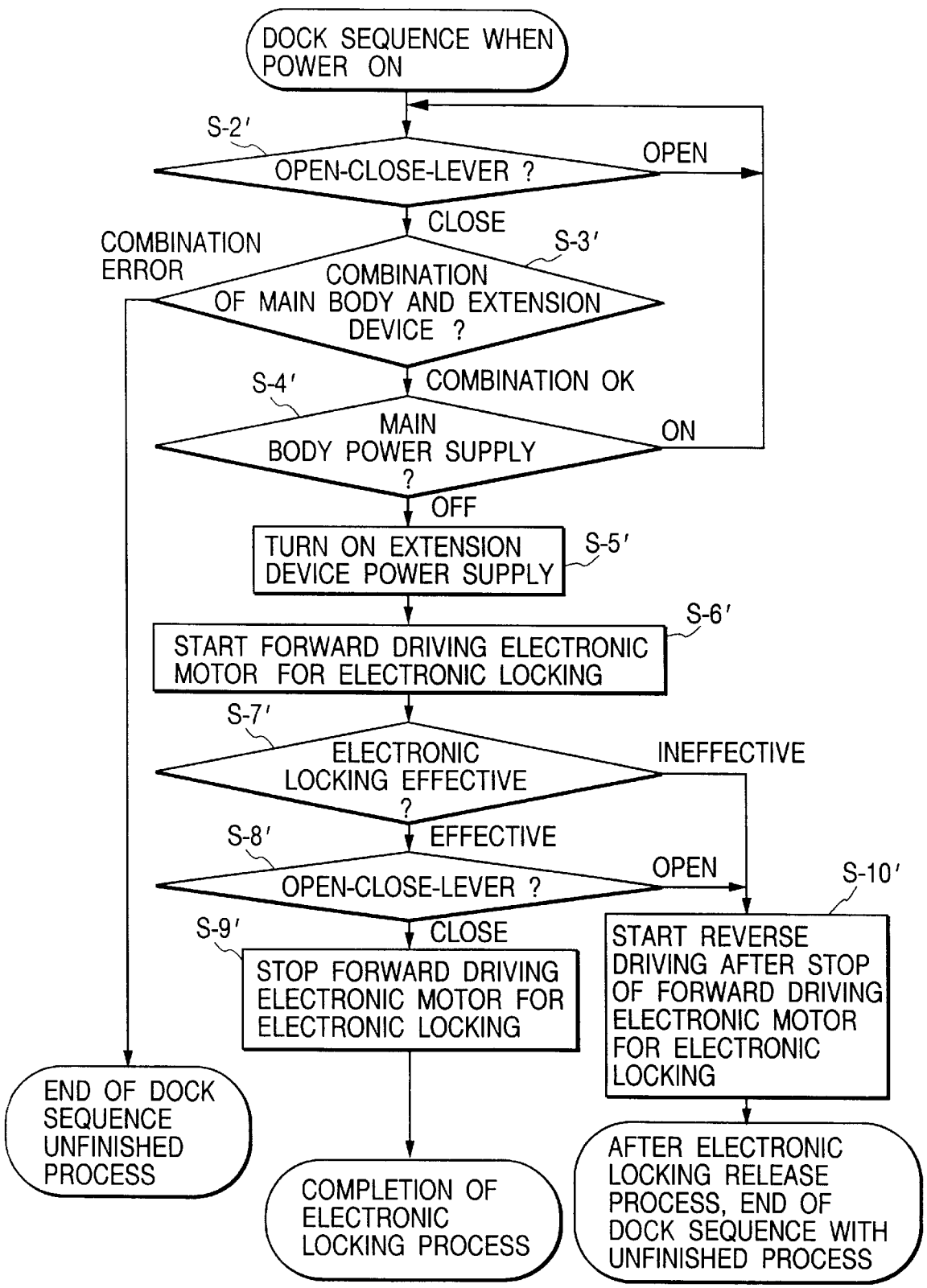

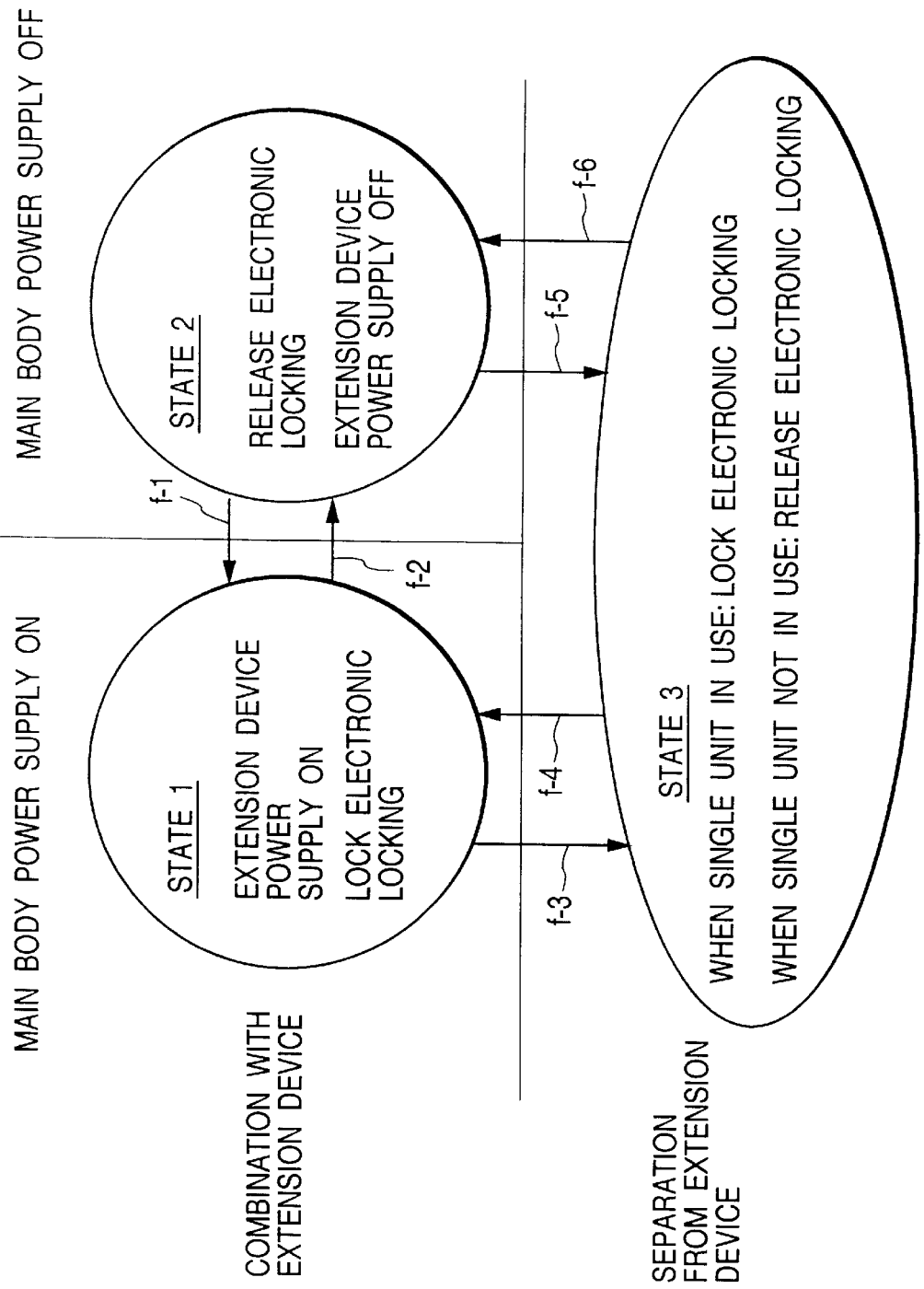

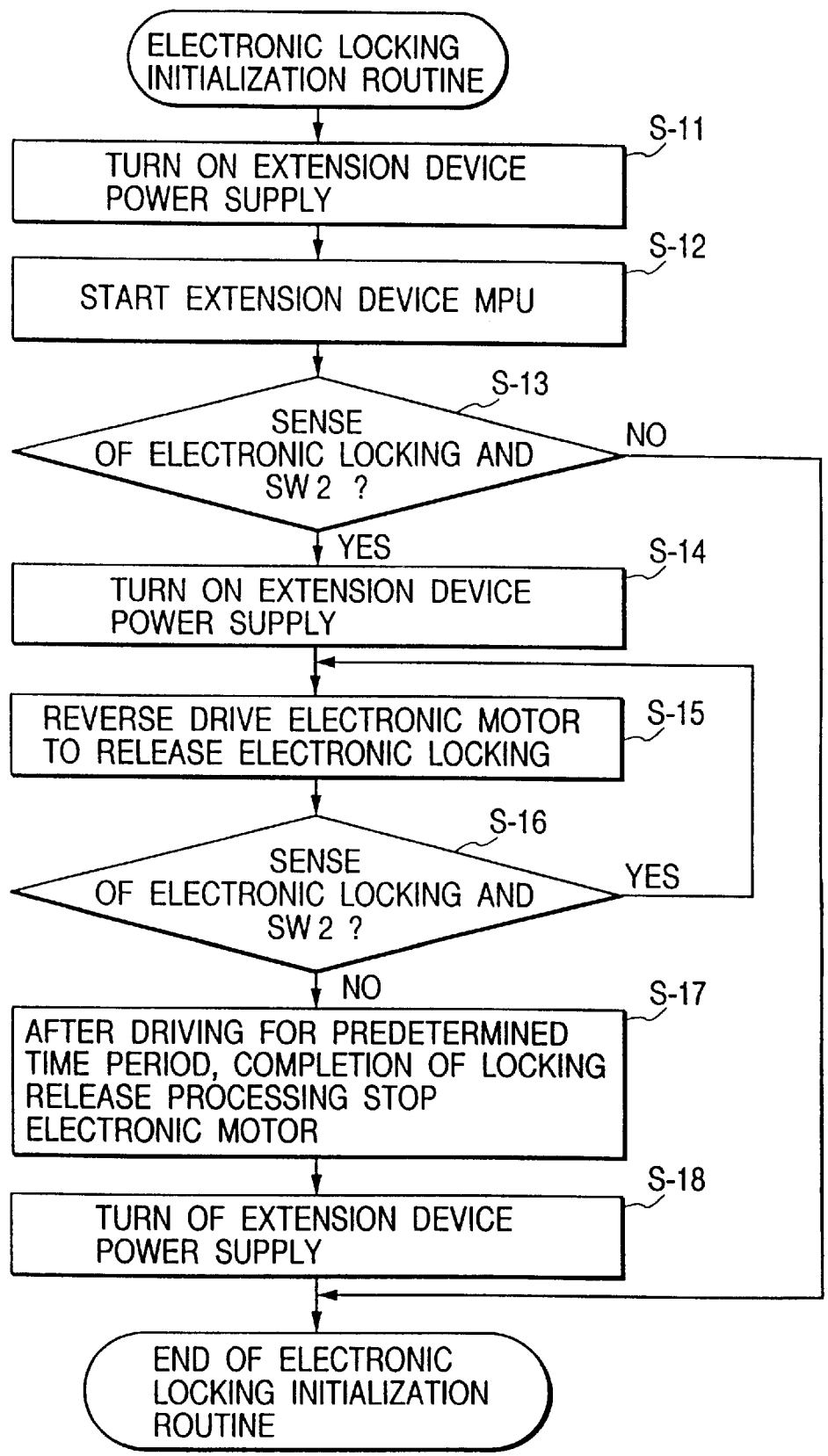

ELECTRONIC EQUIPMENT AND ELECTRONIC EQUIPMENT SYSTEM

BACKGROUND OF THE INVENTION

1. Field of the Invention

The invention relates to an electronic equipment having an electronic locking mechanism in which an extension device for extending a function can be freely combined or separated (attached or detached) and also relates to an electronic equipment system in which the extension device is attached to the electronic equipment.

2. Related Background Art

Hitherto, as seen in a portable PC (personal computer), there has been proposed a system constructed in a manner such that a main body is combined to an extension device in which an FDD, an HDD, a CD-ROM drive, an extension port, an extension board, a memory, and the like are built by connecting connectors.

In the conventional technique, however, the combination of the portable PC and the extension device is performed by considering an image of a desk-top type and a portability is not required after the combination. In recent years, however, a light weight of the equipment is progressing and there are needs to carry them after completion of the combination. The conventional construction as mentioned above has a problem such that there is a danger such that both of the main body and the extension device are destructed by unpurposed separation and removal of a connecting portion.

SUMMARY OF THE INVENTION

The invention is made in consideration of the above problem and it is an object of the invention to provide an electronic equipment and an electronic equipment system, in which destruction and a danger due to separation and removal of a connecting portion of an electronic equipment main body and an extension device can be prevented and a use efficiency is improved.

According to the invention, there is provided electronic equipment in which an extension device for extending a function can be freely attached or detached, comprising: first locking means for mechanically coupling the extension device and locking; and second locking means for inhibiting an unlocking of the first locking means.

According to the invention, there is also provided an electronic equipment system in which an extension for extending a function is detachably attached to electronic equipment, comprising: first locking means for mechanically coupling the extension device to the electronic equipment and locking; and second locking means for inhibiting an unlocking of the first locking means.

BRIEF DESCRIPTION OF THE DRAWINGS

FIG. 6 is a flowchart showing a dock sequence from a power OFF of the main body and the extension device;

FIG. 7 is a flowchart showing a dock sequence from a power ON of the main body and the extension device;

FIG. 8 is an explanatory diagram showing power supply states of the main body in which an electronic locking is turned ON/OFF and the extension device;

FIG. 15 is a flowchart for initializing the electronic locking;

DETAILED DESCRIPTION OF THE PREFERRED EMBODIMENTS

Embodiments of the invention will now be described hereinbelow.

Figure 1:
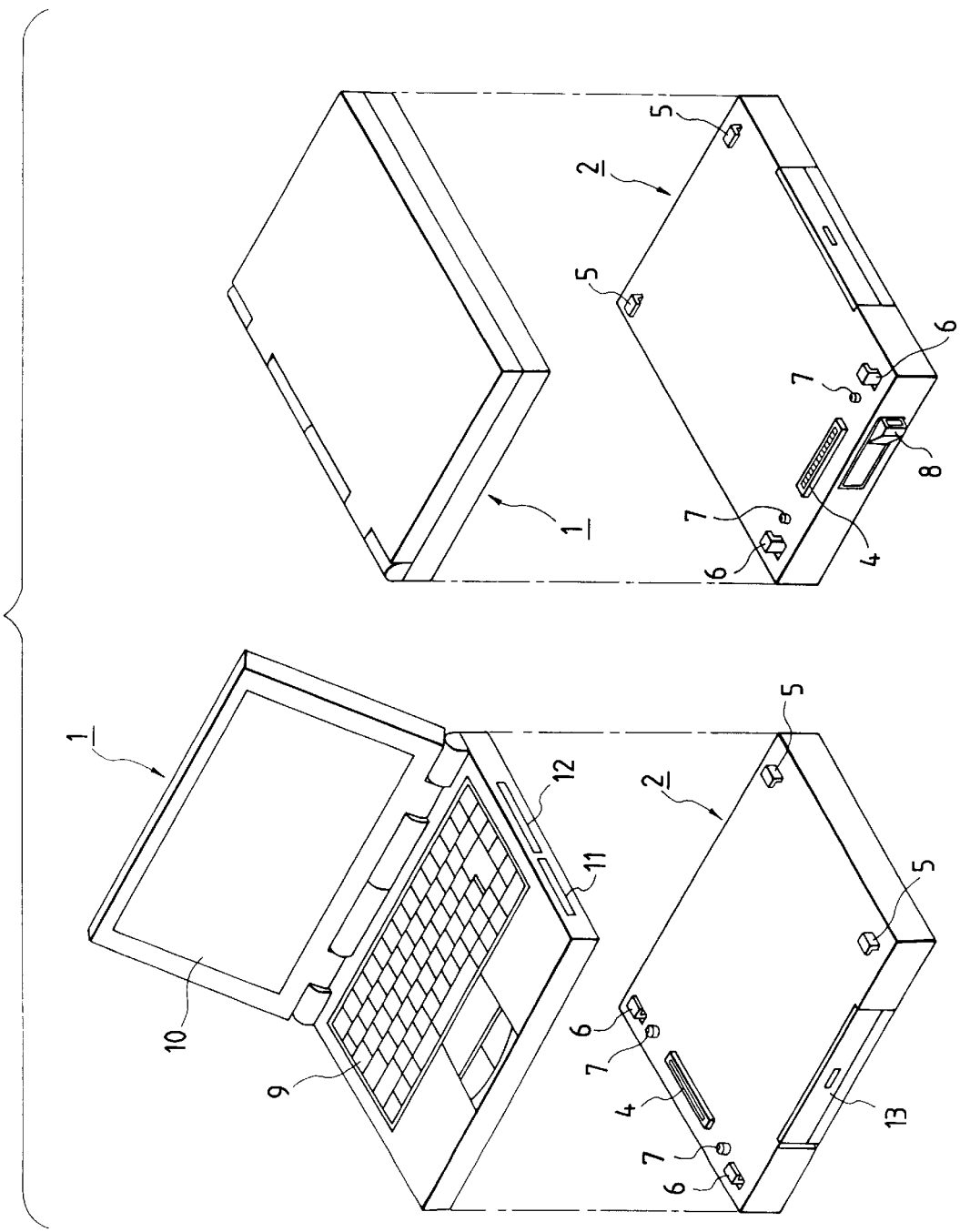
FIG. 1 is a perspective view showing a construction of an embodiment of the invention.

(a) First Embodiment:

FIG. 1 shows construction of an embodiment in a notebook-sized personal computer (PC). FIG. 1 shows it as one of embodiments and the invention is not limited to the personal computer. A personal computer main body 1 as an electronic equipment main body has a display apparatus 10, a keyboard input apparatus 9, a hard disk apparatus 11, and a floppy disk apparatus 12.

An extension device 2 has therein a CD-ROM drive apparatus 13 and an extension board such as port replicater, communication, sound source, and the like (although not shown). In the extension device 2, fixing claws 5 are formed on the right side of the upper surface, movable claws 6 which are interlocked with an open-close-lever 8 to separate or combine are formed on the left side, and a connector 4 is arranged at an intermediate position between the two movable claws 6 so as to be movable by a micro distance. Projecting pins 7 are arranged on both sides of the connector 4.

Figure 2:
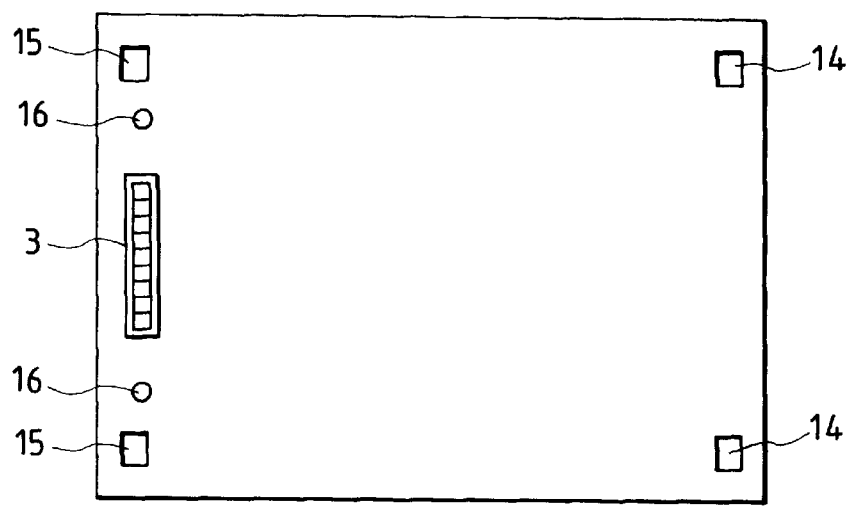
FIG. 2 is a bottom view showing a back surface of a main body.

As shown in FIG. 2, retaining holes 14 for retaining to the fixing claws 5, retaining holes 15 for retaining to the movable claws 6, and engaging holes 16 for coming into engagement with the projecting pins 7 are formed on the back surface of the main body, respectively. Reference numeral 3 denotes a connector on the main body side adapted to be connected to the connector 4 of the extension device 2.

Figure 3:
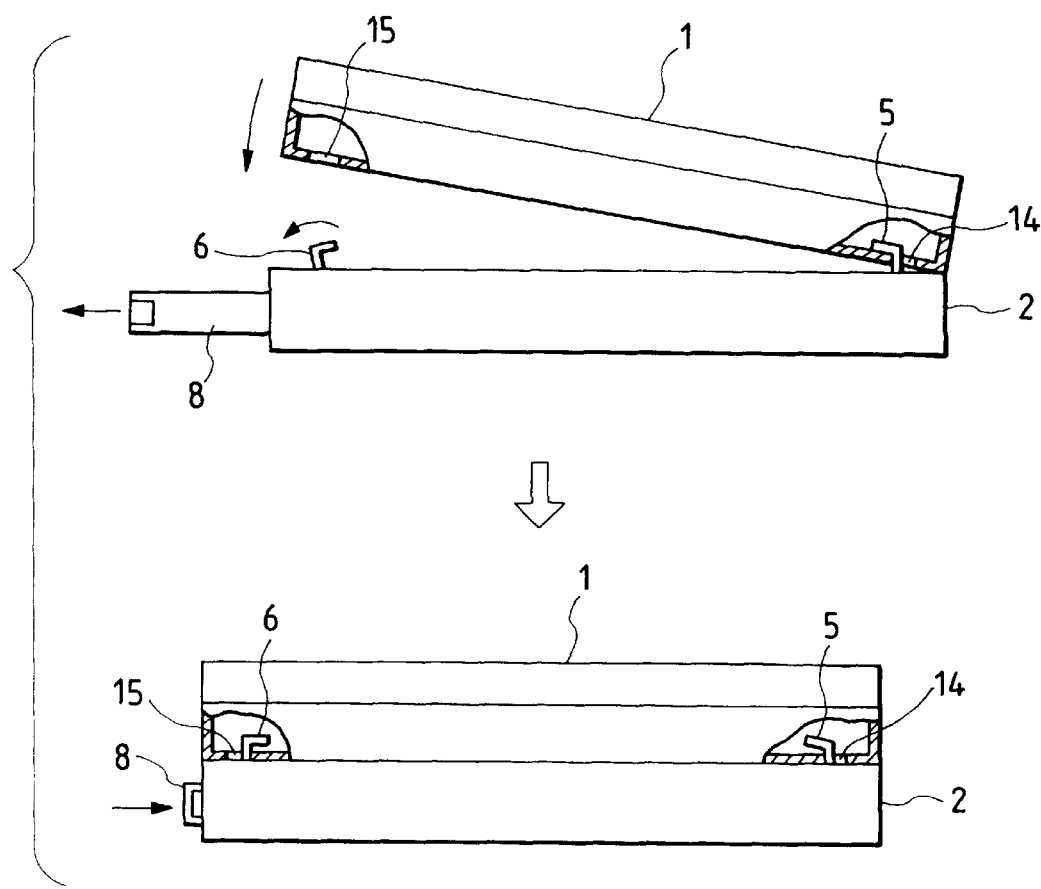
FIG. 3 is an explanatory diagram showing a method of combining the main body and an extension device.

FIG. 3 is a diagram showing a method of combining the main body 1 and extension device 2. The open-close-lever 8 is opened to the outside, the movable claws 6 are inclined to the outside, and the retaining holes 14 on the right side are hooked to the fixing claws 5 of the extension device 2, respectively. Subsequently, the left side of the main body is descended, thereby connecting the connectors 3 and 4. After that, by closing the open-close-lever 8, the movable claws 6 are retained into the retaining holes 15, thereby completing the combination. The above construction is a first locking mechanism. By executing the processes of the above flow in the reverse direction, the main body 1 and extension device 2 can be easily removed.

Although the connection and disconnection can be performed by only the mechanical operation as mentioned above, in a notebook-sized personal computer in which importance is made to the portability, in case of combining the main body 1 and extension device 2 and carrying them, so long as only the above first mechanical locking mechanism composed of only the open-close-lever 8 is used, an anxiety such as damage or spark of the equipment due to a semi-pulling-out or a sudden drop-out cannot be eliminated.

In the embodiment, therefore, the first locking mechanism is further enhanced by further providing a second locking mechanism (electronic locking mechanism) for driving the open-close-lever 8 by using an electronic motor.

Figure 4:
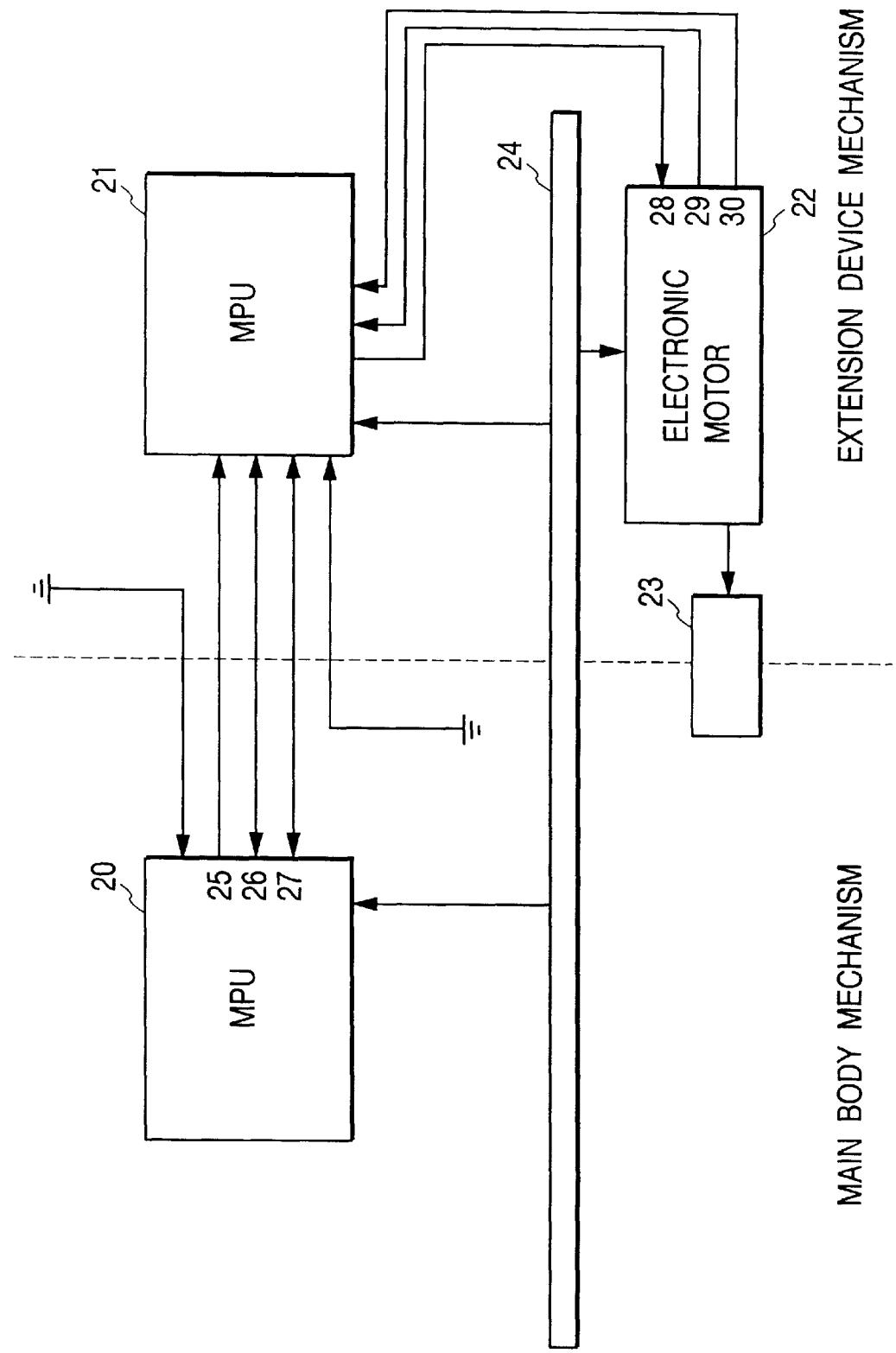
FIG. 4 is a block diagram showing a construction of a system for realizing an electronic locking mechanism of the main body and the extension device.

FIG. 4 is a block diagram showing construction of a system for realizing the second locking mechanism. To realize the second locking mechanism, as shown in FIG. 4, there is needed an intelligent driving system including: a mechanism 23 for locking the open-close-lever 8; an electronic motor 22 for locking the mechanism 23; and an MPU 21 for driving the electronic motor 22.

MPUs 20 and 21 monitor whether the main body 1 and extension device 2 are connected (docked) or not (on the basis of an input signal from a ground in the diagram), detect whether the open-close-lever 8 is ON (sensor signal 29) or not, and assure a power supply line 24 of the main body 1 and extension device 2 when the docking of them is recognized, thereby enabling them to be started by at least one of the power supplies. Reference numeral 25 denotes a signal for a started one of the MPUs to wake up the other stopped MPU. The signal 25 requests such that the power supply can be supplied after the power supply line 24 was connected.

When the power supply of the main body side is turned ON, the MPU 20 turns ON the power supply of the main body 1 and, simultaneously, communicates through the connectors 3 and 4 and instructs the MPU 21 so as to turn ON the power supply on the extension device side. For instance, a serial communication is used as control means by using two signals of a clock signal 26 and a data signal 27. It doesn't limit communicating means.

When receiving the instruction, the MPU 21 turns ON the power supply of the extension device 2 and drives the electronic motor 22 for realizing the second locking mechanism. When the MPU 21 detects the completion of the electronic locking by a sensor signal 30 indicative of the detection of the latching by the electronic motor 22, the electronic motor 22 is stopped, thereby finishing a control of the second locking mechanism for disenabling the open-close-lever 8 to be opened.

Figure 5:
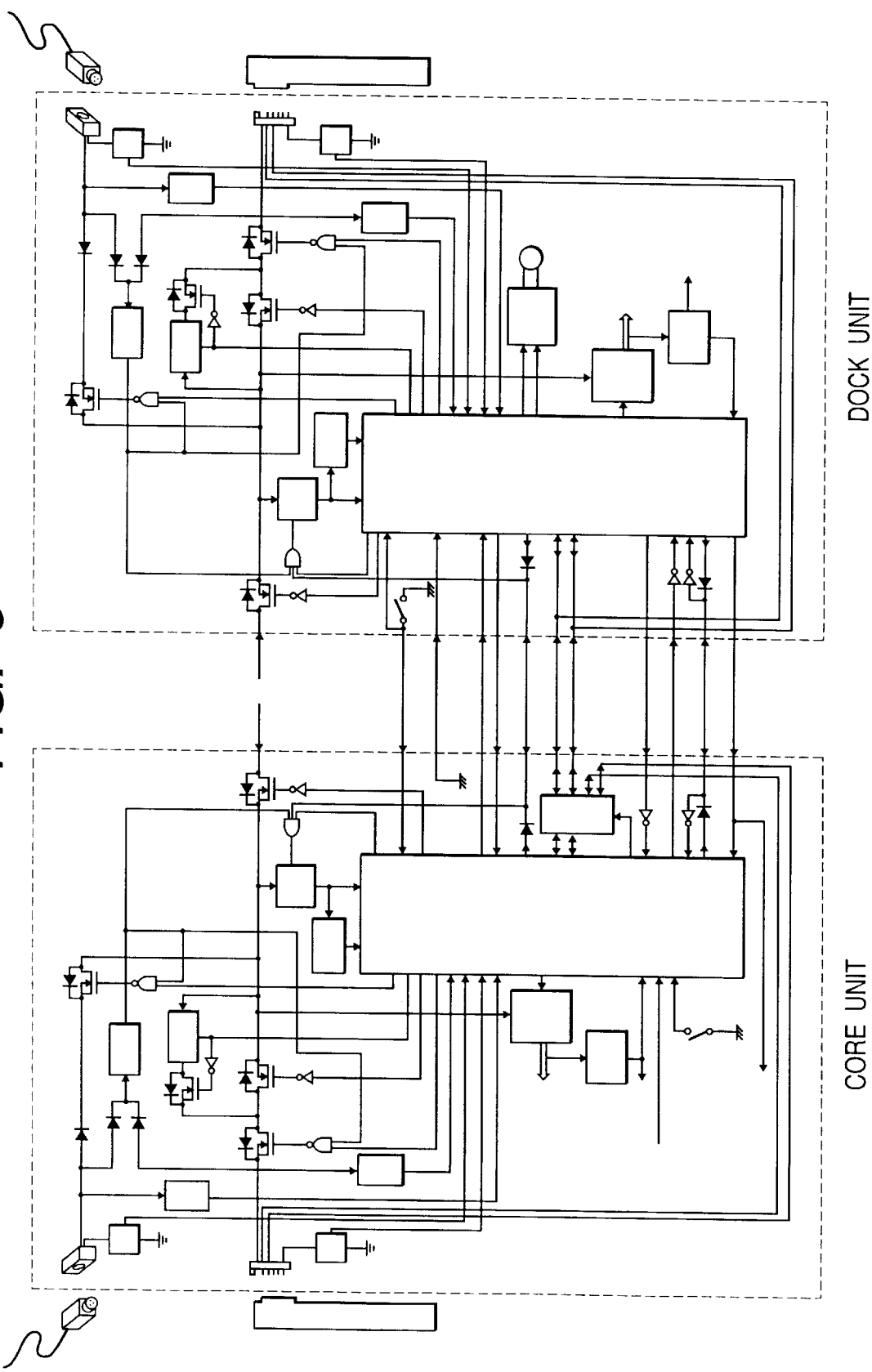
FIG. 5 is a block diagram of a notebook-sized personal computer including signals between the main body side and the extension device side.

FIG. 5 is a diagram showing a constructional block of a notebook-sized personal computer including signals between an MPU (Core Unit) on the main body side and an MPU (Dock Unit) on the extension device side. A locking mechanism of the embodiment drives the electronic motor 22 from an input signal to detect the presence or absence of dock states of DOCK_DK* (DOCK CR*) and an input signal to detect the opening or closing of the open-close-lever 8 of LEVER Sw (SW1) and detects a completion of the latching of the electronic locking from an input signal of LOCKACK (SW2) (not shown). The SW2 input signal is used to stop the electronic motor 22. The system has signal lines of a clock and data for enabling a serial communication to be executed between the MPU of I2CCLK and the MPU of I2CDATA. By the serial communication between the MPUs, the power sources can be managed irrespective of the power supply state of each of the main body 1 and extension device 2.

FIGS. 6 and 7 are diagrams showing flows for dock sequences of the main body 1 and extension device 2. FIG. 6 is a flowchart for docking from the power-OFF of the main body 1. FIG. 7 is a flowchart for docking from the power-ON of the main body 1. Explanation will now be made hereinbelow in accordance with processing steps of the flow.

First, an operator performs operation for combining connecting portions of the main body 1 and extension device 2 and closing the open-close-lever 8, and then processing steps as shown in the flowchart are started. Step S-2 (S-2') is a process for allowing the MPU 21 of the extension device 2 to poll a switch (sensor) SW1 to detect the opening or closing of the open-close-lever 8. Step S-3 (S-3') is a process for discriminating whether the main body 1 and extension device 2 have been connected or not after it was determined in step S-2 (S-2') that the lever 8 is closed. If they are not connected, the processing dock sequence is finished as an unfinished process. If they are connected, the processing routine advances to step S-4 (S-4'). Step S-4 is a process for discriminating whether the main body 1 has been started or not after the combination was decided in the pre-process. When the main body 1 is not started, the processing routine is returned to step S-2. When the main body 1 has been started, step S-5 follows. Also, step S-4' is a process for discriminating whether the main body 1 has been started or not after the combination was decided in the pre-process. When the main body 1 has been started, the processing routine is returned to step S2'. When the main body 1 is not started, step S-5' follows. Step S-5 (S-5') is a process for turning ON the power supply of the extension device 2. Step S-6 (S-6') is a process for driving the electronic motor 22 in order to lock the electronic locking. Step S-7 (S7') is a process for polling a switch (sensor) SW2 to detect that the open-close-lever 8 cannot be opened because the electronic locking was locked. If the electronic locking is not locked, step S-10 (S-10') follows. If the electronic locking has been locked, step S-8 (S-8') follows. Step S-8 (S-8') is a process for polling the switch SWl to detect whether the open-close-lever 8 has been closed or not after it was detected in step S-7 (S-7') that the electronic locking had been locked. When it is determined that the lever 8 is closed, the forward driving of the electronic motor 22 is stopped in step S-9 (S-9') and the electronic locking sequence is finished. When the opening of the open-close-lever 8 is decided during the driving of the electronic motor 22, the forward driving of the electronic motor 22 is stopped in step S-10 (S10'). The reverse driving is started and a series of electronic locking sequence from step S-1 is stopped, thereby unlocking.

FIG. 8 is a diagram showing power supply states of the main body 1 and extension device 2 for turning ON/OFF the electronic locking. When the main body 1 and extension device are combined, the power supply state is classified into State1 as an ON state and State2 as an OFF state in accordance with the power supply state of the main body 1.

There are three kinds of state transitions among States including State3 indicating that the main body and the extension device are not combined. In the diagram, f-1 denotes a transition when the power supply of the main body 1 is turned ON and the open-close-lever 8 is closed. f-2 denotes a transition when the power supply of the main body 1 is turned OFF. f-3 denotes a transition when an un-docking is requested (hot undock) while keeping the power-ON of the main body 1 and, after the electronic locking was released, the open-close-lever 8 is opened and the extension device 2 is disconnected. f-4 denotes a transition when the main body 1 is connected to the extension device 2 while keeping the power-ON of the main body 1, the open-close-lever 8 is closed, and the docking is requested (hot dock). f-5 denotes a transition when the open-close-lever 8 is opened and the extension device 2 is disconnected. f-6 denotes a transition when the main body 1 is connected to the extension device 2.

The "hot undock" denotes that the extension device 2 is disconnected without turning OFF the power supply in a state in which the main body 1 is started. Generally, "hot undock" is often requested by a key operation (depression of a hot key) or on the OS (operating system).

The above embodiment will now be described further in detail.

In the embodiment, when the power supply is OFF, the electronic locking is released and, when the power supply is ON, the electronic locking is locked. This is because it is necessary to release the electronic locking in order to enable the main body 1 and extension device 2 to be attached or detached (undock) by always opening the open-close-lever 8 when the power supply is OFF. When the electronic locking is not released even when the power supply is OFF, there are the following three problems because of the undock.

First, since a complicated operation to turn ON the power supply, turn ON an undock switch SW, or the like is required for the user for the purpose of undocking of the main body 1 and extension device 2, such a state becomes fatal in equipment in which importance is made to a simple operability. Second, since a power supply is necessary to drive the electronic motor 22 for enabling the electronic locking to be released, a series of flows such as request for the power ON of the main body 1, request for the power ON of the extension device 2 by a communication between the main body 1 and extension device 2, power ON of the extension device 2, and start of driving of the electronic motor 22, and a device for preventing that the notebook-sized personal computer is not made operative by the power ON is also indispensable, so that a load is applied to the equipment in case of frequently executing the docking and undocking processes. Third, a contradictory function is enhanced for a notebook-sized personal computer in which a developing force is paid to techniques such that a priority is given to the power saving and a power management function is effected and a driving time by a battery is extended.

From the above reasons, a construction such that when the power supply is ON, the electronic locking is locked to thereby disenable the main body to be detached from the extension device, and when the power supply is OFF, the electronic locking is released to thereby enable the open-close-lever 8 to be freely opened or closed, thereby always making the main body and extension device detachable is very effective means.

In case of docking while keeping the power ON of the main body, by closing the open-close-lever 8 after completion of the connection, the MPUs 20 and 21 of both equipment assure the power supply line 24. The MPU 21 of the extension device 2 turns ON the power supply by the serial communication and locks the electronic locking, thereby completing the dock sequence. After that, when the power supply is turned OFF, the electronic locking is released. When the power supply is turned ON, the electronic locking is locked in the case where the open-close-lever 8 is closed.

In case of requesting the undock at the time of power ON, a bus between the main body 1 and extension device 2 is disconnected from a trigger by the SW (irrespective of the key operation or the pointing or touch panel of the display), a serial communication between the MPUs of both equipment is executed, the electronic locking is released by the MPU 21 of the extension device 2, and the power supply is turned OFF. The extension device side has an LED (display) to notify the completion of the undock. By lighting on the LED, the completion of the undock is notified to the user, thereby informing that both equipment can be disconnected by opening the open-close-lever 8.

In this instance, since the power supply of the extension device 2 is OFF and the main body 1 maintains the power ON, the system can be continuously used as it is irrespective of the connection or disconnection. In order to again escape from this status, the open-close-lever 8 is once opened or closed and a process for docking is executed while keeping the power ON of the main body 1, or after the power supply was once turned OFF, by again turning ON the power supply, both equipment can be docked.

(b) Second Embodiment:

According to the second embodiment, since it is necessary to interlockingly control the main body 1 and extension device 2, a dedicated MPU is installed and the power supply of each equipment is independently managed. On the other hand, a communicating unit which can mutually transfer information when a necessity to interlockingly control occurs due to the dock or the like is provided. When the MPU 20 detects the power ON of the main body 1, a command to request the MPU 21 of the extension device 2 to turn ON the power supply is transmitted through the communicating unit. When receiving the above command, the MPU 21 of the extension device 2 turns ON the power supply of the extension device 2 and locks the electronic locking by using the second locking mechanism for locking the open-close-lever 8.

Figure 9A:
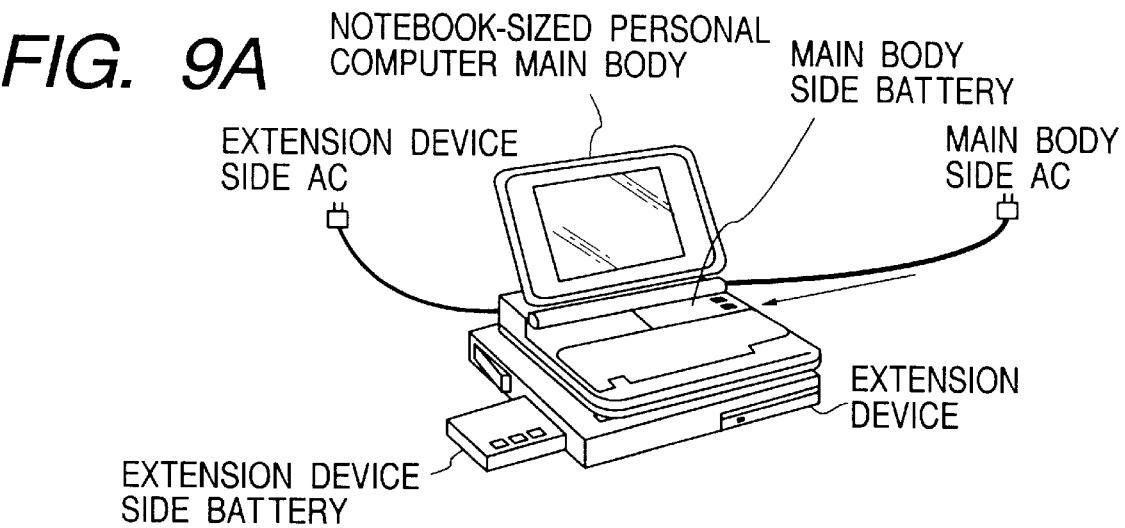
FIGS. 9A, 9B, 9C and 9D are explanatory diagrams showing four kinds of charging forms according to the presence or absence of a power supply of an equipment.
Figure 9B:
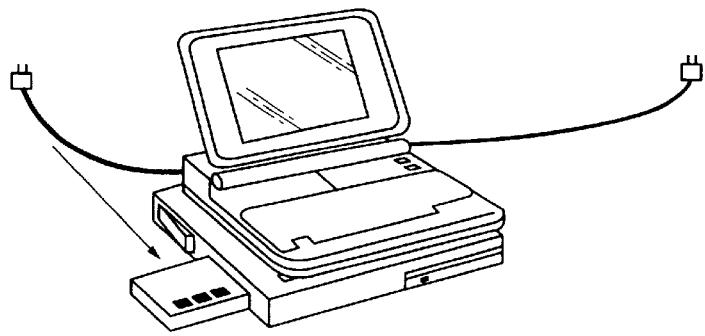
Figure 9C:
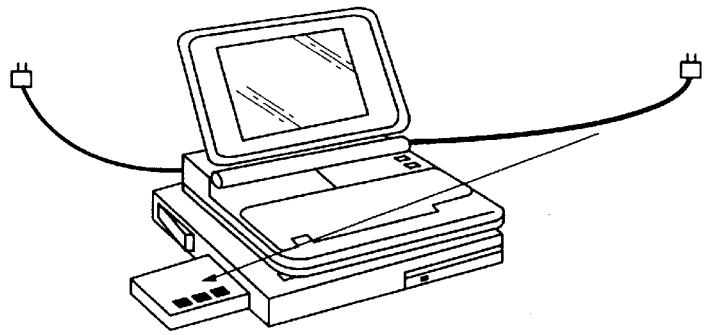
Figure 9D:
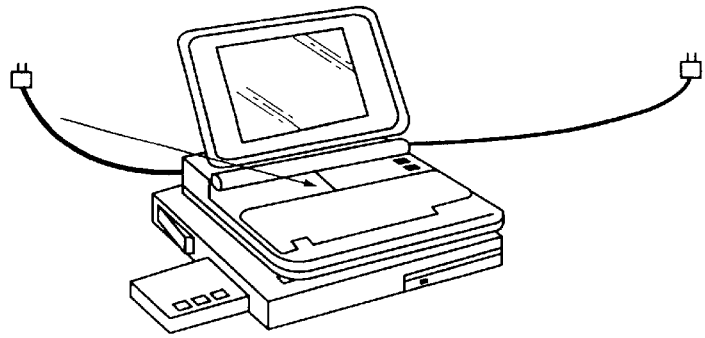

In case of charging in order to mutually notifying the kinds (AC power supply, battery, . . . ) of power supplies of the main body 1 and extension device 2, the above communicating unit is effective power control means also in order to normally finish the following four kinds of charging steps without booking: namely, a step of charging a main body side battery by a main body side AC power supply as shown in FIG. 9A; a step of charging an extension device side battery by an extension device side AC power supply as shown in FIG. 9B; a step of charging the extension device side battery by the main body side AC power supply as shown in FIG. 9C; and a step of charging the main body side battery by the extension device side AC power supply as shown in FIG. 9D.

Figure 10:
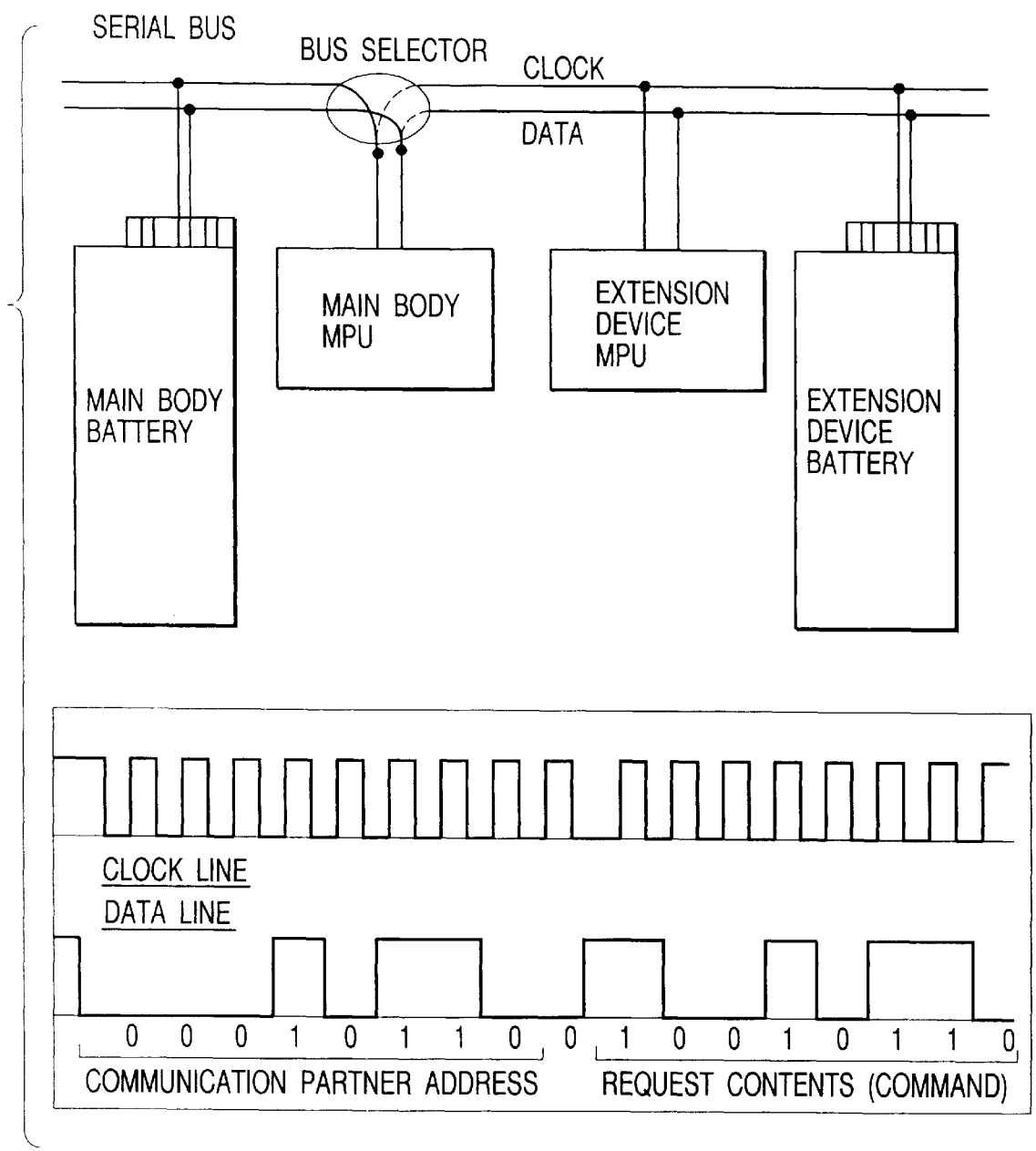
FIG. 10 is a diagram showing a serial communication system using an I2C protocol.

FIG. 10 is a diagram showing a serial communicating system using an I2C protocol as an example. Communicating units of the MPU and the battery can be also commonly used. (The main body side MPU—the main body side battery), (the main body side MPU—the extension device side MPU), and (the extension device side MPU—the extension device side battery) are mutually connected by only two communication lines of a clock and data, thereby enabling a communication or the like between (the main body side MPU—the extension side battery) to be generalized.

For the MPU, the above construction makes it possible to effectively use resources with respect to a point that a plurality of devices can be controlled by only two ports. In the dual MPU system, by extending the communicating unit, a generality is provided for both of the main body 1 and the extension device 2 and an equipment newly developed can be also easily docked.

Figure 11:
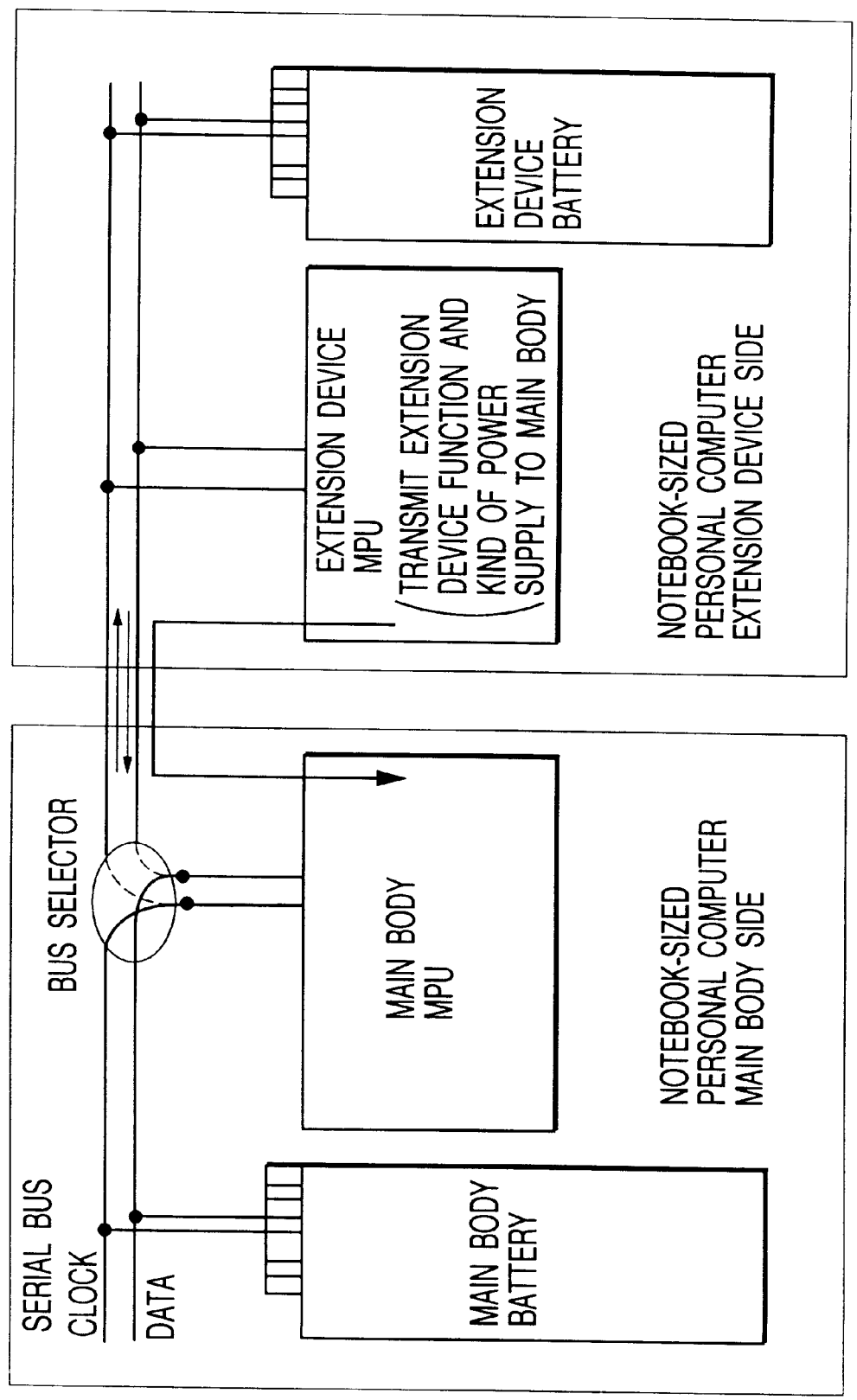
FIG. 11 is a block diagram showing construction of a system for discriminating a general extension device by an inter-communication between two MPUs.

That is, as shown in FIG. 11, a possibility of a development of a general extension device in which every possible peripheral device is combined is widened.

Figure 12A:
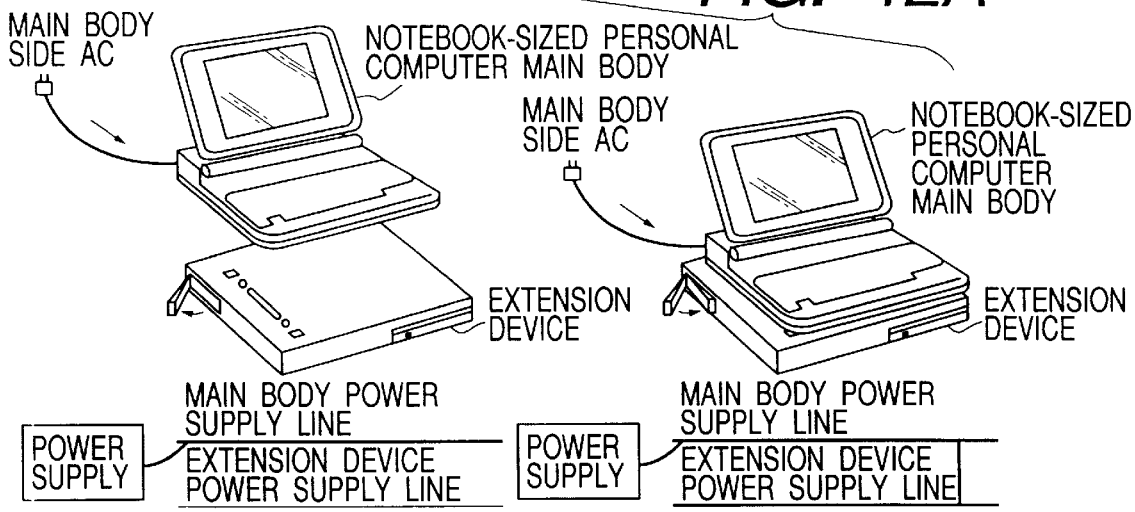
FIGS. 12A, 12B and 12C are explanatory diagrams showing a connecting situation of a power supply line.
Figure 12B:
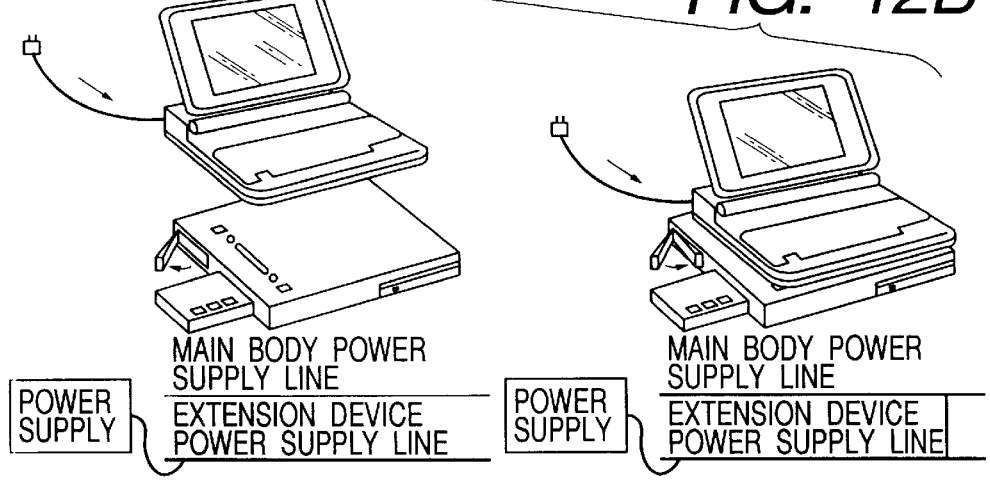
Figure 12C:
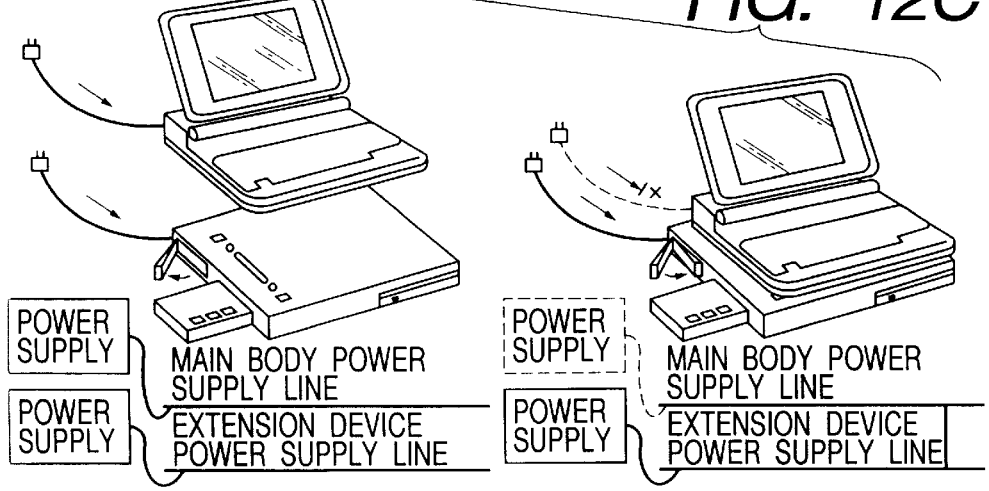

(c) Third Embodiment:

According to the third embodiment, the opening/closing operation of the open-close-lever 8 which enables the operation of the first locking mechanism becomes a trigger to request a connection and a disconnection of the power supply line 24 between the main body 1 and extension device 2. As shown in FIGS. 12A to 12C, this enables both equipment to be driven irrespective of a state of the presence or absence of the power supplies of both of the main body 1 and extension device 2.

FIG. 12A schematically shows the connection of the power supply line 24 in the case where the open-close-lever 8 is closed in a state in which there is the power supply in the main body 1 and there is no power supply in the extension device 2. Likewise, FIG. 12B shows such a connection in the case where the open-close-lever 8 is closed in a state in which there is no power supply in the main body 1 and there is the power supply in the extension device 2. FIG. 12C shows such a connection in the case where the open-close-lever 8 is closed in a state in which there are the power supplies in both equipment.

In any case, the power supply line 24 between the power connectors is disconnected instantaneously with the opening of the open-close-lever 8. This is because it is an object to avoid a spark, a short-circuit, or the like in association with the attachment or detachment of the connectors when both equipment are disconnected.

When the first locking mechanism is made function by closing the open-close-lever 8, in FIGS. 12A and 12B, it is a fundamental concept to realize the invention that by supplying a power source from the equipment with the power supply to the equipment having no power supply and by activating the MPU on the equipment side having no power supply, the power supply management level can be matched with that of the MPU which has already been started. That is, since the electronic locking serving as a second locking mechanism is executed only after the power supply line 24 was connected, it is possible to perform the control by the MPU 21 on the extension device side having no power supply.

Since the power supply line 24 is disconnected by opening the open-close-lever 8 after the electronic locking serving as a second locking mechanism was released, the MPU 21 of the extension device 2 is not stopped in the locked state of the electronic locking. According to the invention, the processes can be completed without specifying the power supply states of the main body 1 and extension device 2 (example: only when there is the power supply in the extension device 2, the docking can be performed, . . . ).

On the other hand, when the open-close-lever 8 is closed and the first locking mechanism is made to function, in FIG. 12C, since there is no need to make the power supplies of both equipment effective, for example, it is also possible to make the power supply on the extension device side effective and to turn OFF the power supply on the main body side. When the main body side is driven by the battery, the AC power supply of the extension device 2 can be also preferentially switched and it is also possible to control by making an importance to the power saving of the battery.

Further, by making the system function in combination with the foregoing second embodiment, when a battery is used in the power supply, an intelligent power management such that a residual battery capacity is discriminated and whether the battery on the main body side is used or the battery on the extension device side is used is determined can be realized.

(d) Fourth Embodiment:

According to the fourth embodiment, when the open-close-lever 8 is opened at the time of power OFF, the equipment is always disconnected, and in the ON state of the power supply of the main body 1, it is difficult to discriminate a timing to disconnect by opening the open-close-lever 8 after the dock release process was started. Therefore, there is provided a function to notify that the disconnection can be performed by opening the open-close-lever 8 by displaying to the display by a method such that an LED 31 is lit on by turning OFF the power supply of the extension device 2 after completion of the release process of the electronic locking as a releasing operation of the second locking mechanism.

Figure 13:
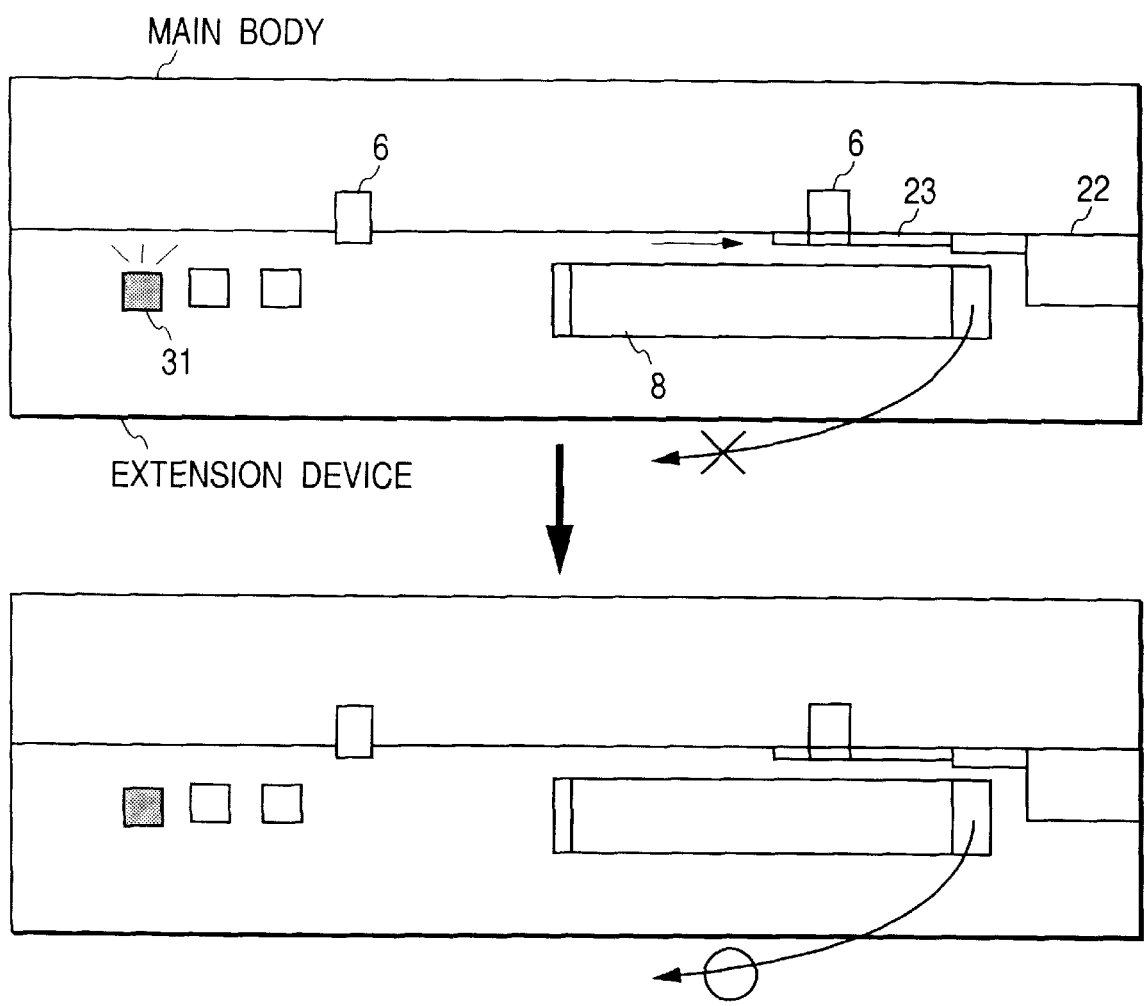
FIG. 13 is a diagram showing a state in which a release of electronic locking is displayed by a display device such as an LED or the like in order to notify the user of a fact that the electronic locking was released.

As shown in FIG. 13, after the release of the locking system was requested, in order to inform a message indicating that the undock is being performed during the disconnecting process of the device installed in the extension device 2 and during the release process of the electronic locking, the LED 31 is made to flicker, thereby alarming a message indicating that both equipment cannot be disconnected yet. Further, the electronic locking is released and the electronic motor 22 is stopped and when the power supply of the extension device 2 is turned OFF, the LED 31 is lit on, thereby informing that the equipment can be disconnected. The user observes the state of the LED 31, operates the open-close-lever 8, and safely detaches the equipment. By opening the open-close-lever 8 by the user and by disconnecting the power supply line 24, the LED 31 is lit off. When the main body 1 is continuously used with the open-close-lever 8 closed, since the LED 31 is held ON, the LED 31 is automatically lit off when there is no opening/closing operation of the open-close-lever 8 for a predetermined time by using a timer function of the MPU 21 on the extension device side.

As a case which becomes a problem here, however, when there is the power supply on only the extension device side, by opening the open-close-lever 8, the power supply line to the main body side is disconnected and the main body 1 causes a system down. According to the invention, however, it is possible to take a countermeasure such that an alarm is generated by using the display, the electronic locking is not released, or the like. However, such a countermeasure is performed on the assumption that the presence or absence of the power supplies of both equipment and the connecting states are always detected by the intercommunication between the MPUs of both equipment according to the second embodiment mentioned above as a prerequisite.

(e) Fifth Embodiment:

According to the fifth embodiment, a device SW1 for detecting the opening or closing of the open-close-lever 8 and a device SW2 for discriminating whether the electronic locking as a second locking mechanism has been locked or not, namely, for detecting a latching to inhibit the opening or closing of the open-close-lever 8 are provided as sensors. A timing for sensing by the sensor SW1 is made variable in accordance with the state of the sensor SW2, thereby avoiding a possibility such that the opening/closing of the open-close-lever 8 is momentarily made inoperative in a loose portion of the lever 8 and a power shut-off of an electronic equipment is caused.

Figure 14:
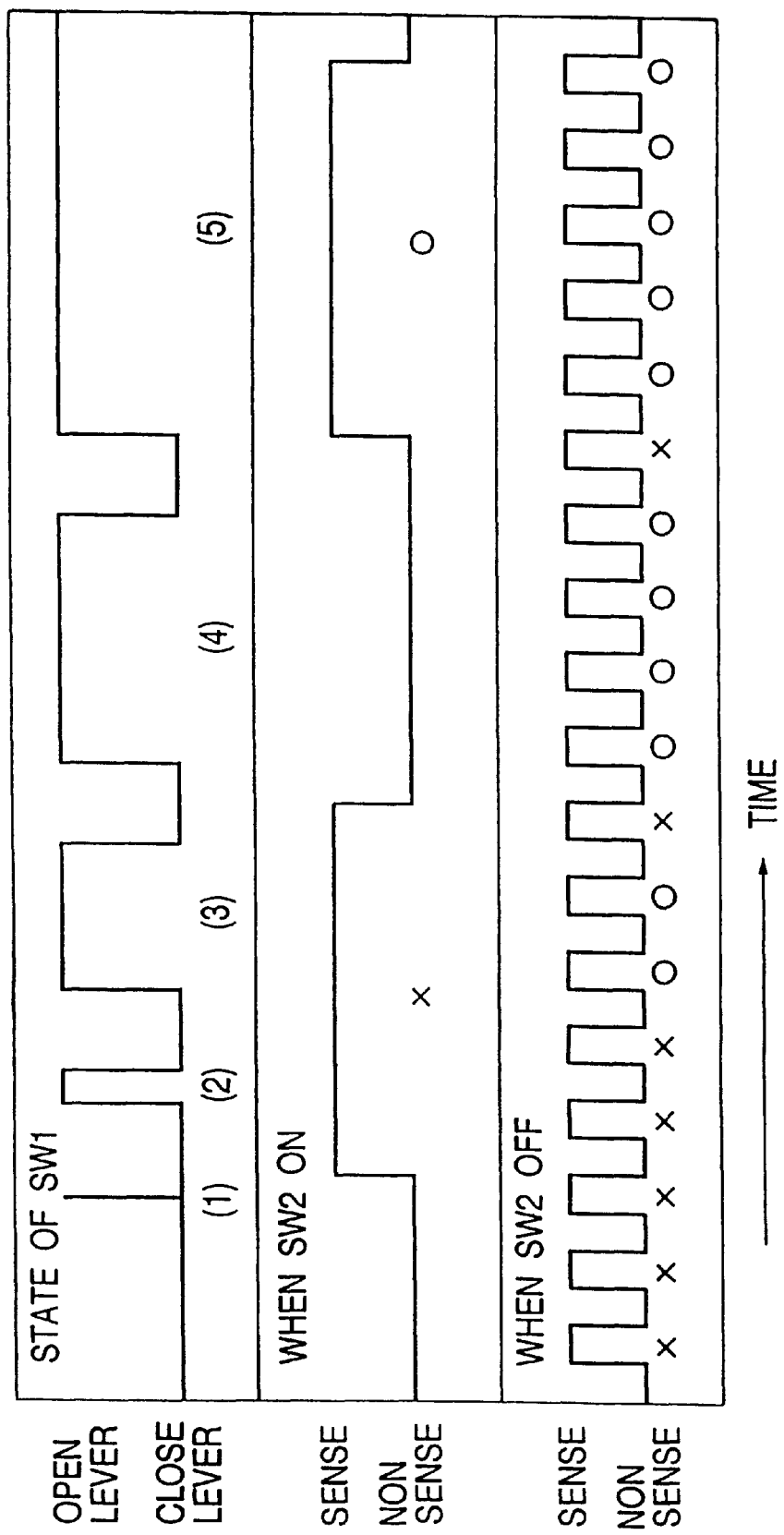
FIG. 14 is a timing chart when a sensing timing of a sensor SW1 is changed in accordance with a state of a sensor SW2.

FIG. 14 shows an example of a timing chart for sensing by the ON/OFF operations of the sensors SW1 and SW2. When the sensor SW2 is OFF (when the electronic locking is released), a sensing period of the SW1 is short and the power supply line is shut off instantaneously with the opening of the open-close-lever 8. When the SW2 is ON (when the electronic locking is locked), the sensing period of the SW1 is long and even when it is determined that the openclose-lever 8 has been opened, if the opening is not continuously detected, the power supply line 24 is held connected. This is because it is necessary to avoid a danger such that the lever 8 is forcibly pulled out after the electronic locking was locked irrespective of purposely or not and the power supply is instantaneously shut off due to a distortion of the lever 8 or a loosening of the sensor.

In FIG. 14, when the electronic locking is locked (SW2 is ON), (1), (2), (3), and (4) are determined to be (x) in which the lever 8 is closed and (5) is decided to be (o) in which the lever 8 is open. When the electronic locking is not locked (SW2 is OFF), (1) and (2) are determined to be (x) in which the lever 8 is closed and (3), (4), and (5) are decided to be (o) in which the lever 8 is open.

(f) Sixth Embodiment:

According to the sixth embodiment, in a locking system apparatus having the above two or more sensors, in the case where the power supply is shut off in a state in which the function of the electronic locking as a second locking mechanism operates, since the electronic locking is held locked in spite of a fact that the power supply is OFF, a function to release the electronic locking at the time of the initialization of the MPU by the next power ON is provided.

FIG. 15 is a flowchart for discriminating whether the electronic locking is initialized or not in dependence on the ON or OFF state of the sensor SW2 when the power supply is turned ON and the MPU is activated. In order to always make the second locking mechanism effective, even in the case where the latching is locked in the middle of the operation, this initializing operation is effective, and it is requested to certainly once release the second locking mechanism by the power ON even when the open-close-lever 8 is closed by docking.

Step S-11 shows a process to turn ON the power supply to the extension device 2, for example, an AC adapter. All of factors to start the MPU 21 of the extension device 2 by connecting the power supply line 24 of the equipment by closing the open-close-lever 8 after the battery was inserted and the docking was performed relate to this process. Step S-12 shows a leading process of the MPU 21 of the extension device 2. Step S-13 shows a process to discriminate whether the electronic locking acts or not. When the electronic locking is not locked, the initialization of the electronic locking is skipped. When it is determined that the electronic locking has been locked, the power supply of the extension device 2 is turned ON in step S-14. In step S-15, a process to reversely drive the electronic motor 22 to release the electronic locking is executed.

Step S-16 shows a process to discriminate whether the electronic locking has been released or not by polling. When it is determined that the electronic locking has been released, in step S-17, the electronic motor 22 is stopped and a process to release the electronic locking is completed. When it is determined that the electronic locking is not released, the processing routine is returned to step S-15. In step S-18, the power supply of the extension device 2 is turned OFF, thereby making such a state coincide with the OFF state of the power supply of the main body 1. The electronic locking initializing process is finished.

(g) Seventh Embodiment:

According to the seventh embodiment, in a locking system apparatus having the above two or more kinds of sensors, there is provided a function for increasing a torque of the electronic motor 22 and retrying by presuming a situation such that after the SW1 to detect the closure of the open-close-lever 8 was detected, in the case where the SW2 to detect whether the electronic locking has been locked or not cannot be detected within a predetermined time, the electronic motor 22 rotates in an idle state due to a cause such as a gear engagement or the like.

Figure 16A:
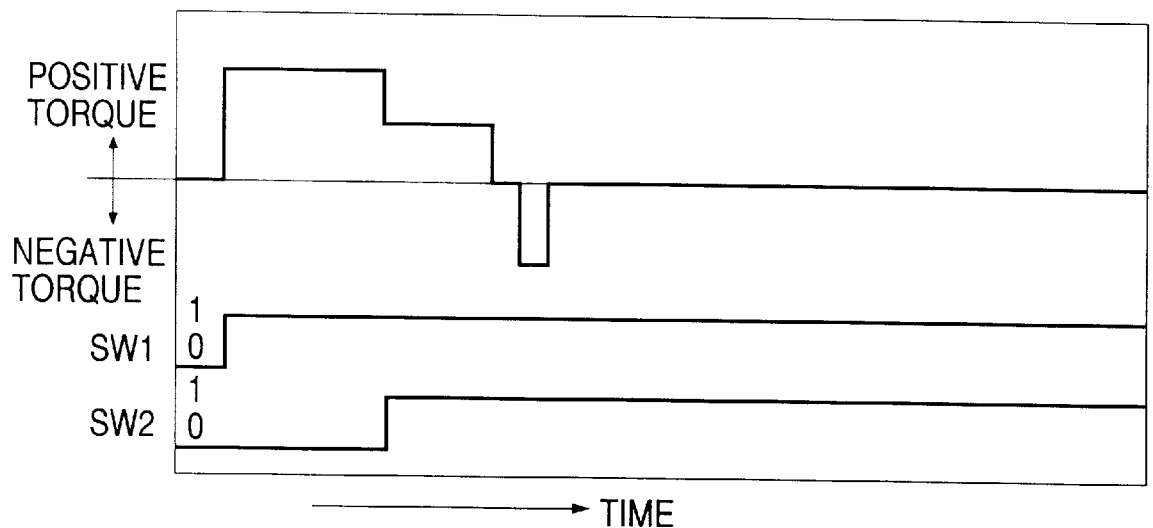
FIGS. 16A and 16B are timing charts showing a step-up increase in torque in case of retrying the electronic locking twice.
Figure 16B:
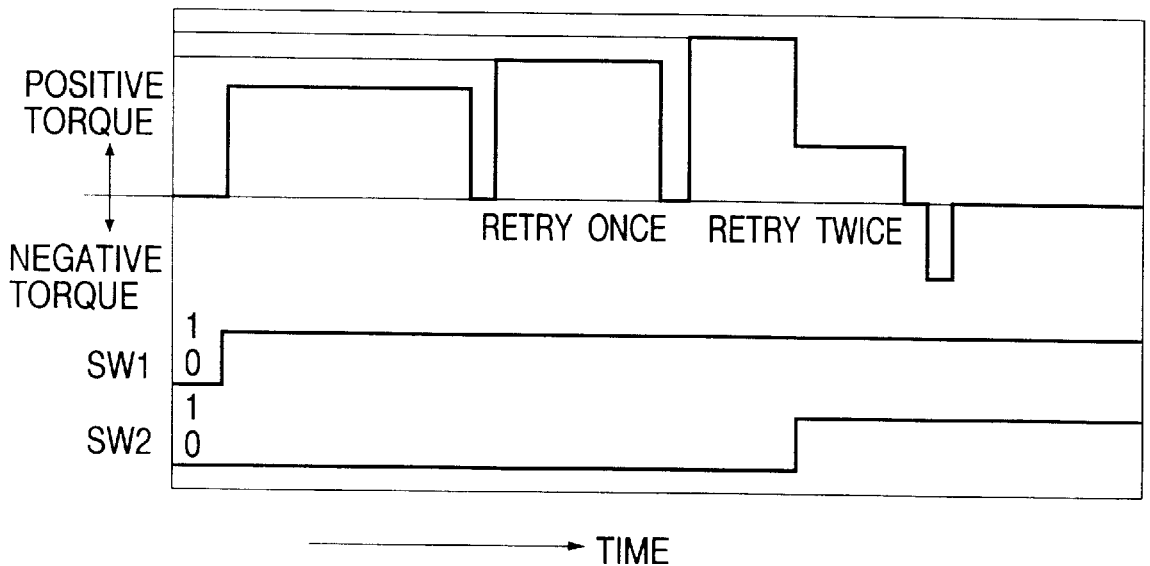

FIG. 16A is a timing chart for a torque control of the electronic motor 22 when the electronic motor 22 does not rotate in an idle state. FIG. 16B is a timing chart for a torque control of the electronic motor 22 in case of retrying twice. By increasing the torque step by step and retrying the electronic locking, a reduction in rotating force due to a deterioration of the gear of the motor 22 in association with an aging change can be compensated.

(h) Eighth and Ninth Embodiments:

According to the eighth embodiment, there is provided a function such that in the case where the SW2 cannot be detected irrespective of the retry of the electronic locking as a second locking mechanism of the seventh embodiment, the process to release the electronic locking is executed and, after completion of the release process, by lighting on or flickering the display such as an LED or the like, the occurrence of a failure of the electronic motor 22 or SW2 is notified to the user.

According to the ninth embodiment, while the main body 1 and extension unit 2 are solely used, the connection is blocked by reversely using the locking mechanism so that both equipment cannot be docked.

Figure 17:
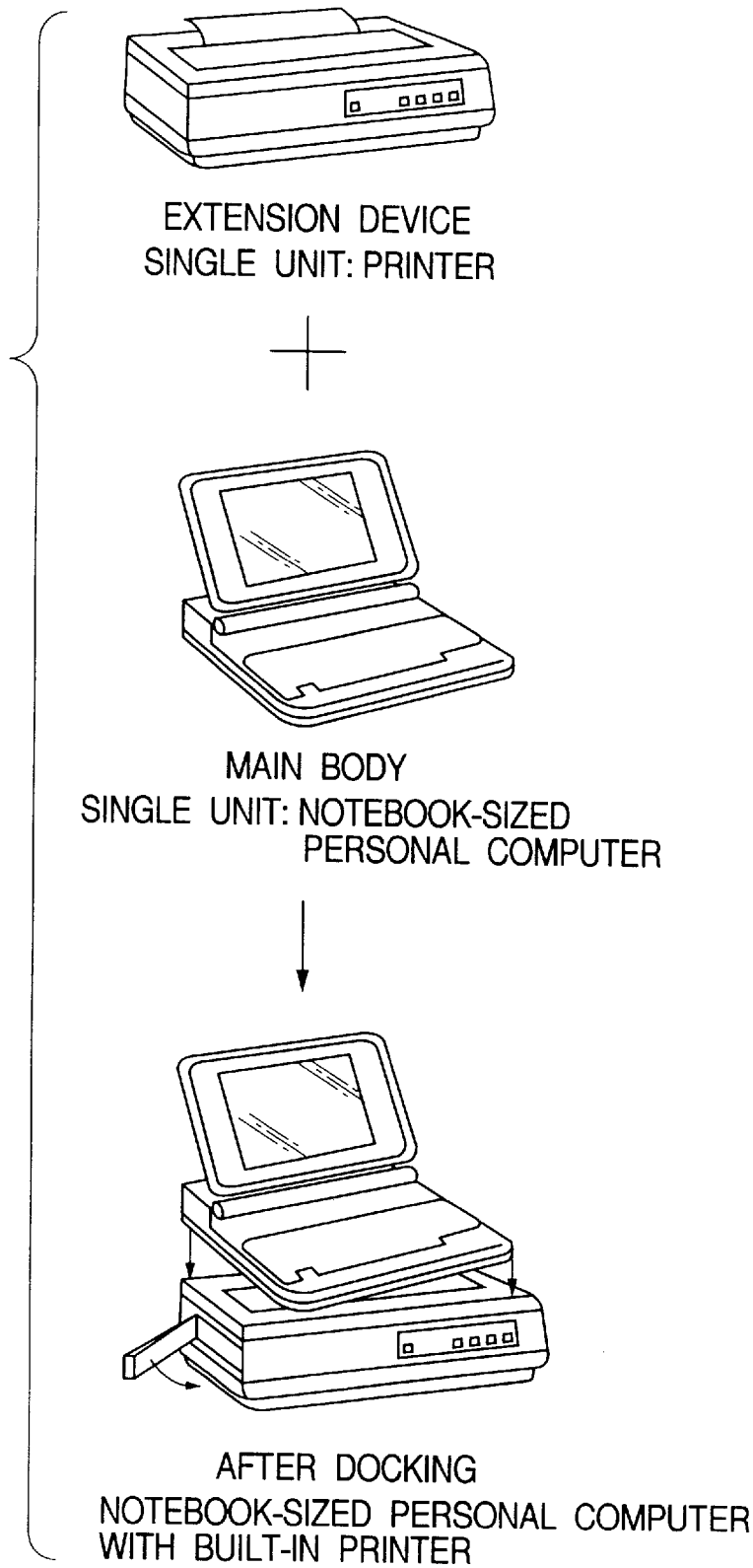
FIG. 17 is a constructional diagram of an electronic equipment system in which the main body is a notebook-sized personal computer and the extension device is a printer.

FIG. 17 shows a constructional diagram of a system in which the main body 1 is a notebook-sized personal computer and the extension device 2 is a notebook-sized printer. There is provided an integrated system such that each of the main body 1 and extension device 2 has a function as a personal computer and a function as a printer as a single equipment, and on the other hand, after docking, they function as a notebook-sized personal computer having a printer therein. In this case, when considering a situation that the notebook-sized personal computer of the main body is docked while the printer as an extension device is printing and is used as a printer of an input of Centronics, there are many problems such that it is necessary to avoid a collision on processes regarding the internal MPU such as interruption of the printing operation, timings for OFF/ON of the power supply of the extension device, it is necessary to prevent external troubles such as a spark and the like when both equipment are combined, and the like. Therefore, the system has a mechanism such that the extension device cannot be docked to the main body while the single extension device is being driven, namely, in this example, the printing operation is being executed.

According to the ninth embodiment, as a condition such that the power supply of the single extension device can be turned ON, a condition that the open-close-lever is closed is set, thereby disabling the main body and the extension device to be mechanically combined by locking the electronic locking as a second locking mechanism after the power supply was turned ON. When the use as a single equipment is finished, by turning OFF the power supply and releasing the electronic locking, the open-close-lever is opened, so that the extension device can be docked to the main body. After both equipment were mechanically combined, the SW to turn ON the power supply so as disable the single extension device to be driven is not exposed. According to the invention, the contradictory objects such as object to avoid the separation and removal of the main body and extension device from the first and second locking mechanisms and object to inhibit the docking can be accomplished by the same apparatus.

(i) Tenth Embodiment:

The tenth embodiment intends to realize an increase in torque of the electronic motor 22 in the seventh embodiment by using a PWM control of the MPU. Since a magnitude of the torque of the electronic motor 22 can be managed by a duty value of a current value, the torque can be easily changed. By measuring and recording a time that is required until the turn-ON of the SW2 from the SW1, the deterioration of the motor 22 is recognized and by purposely raising the duty value, an intelligent control corresponding to it can be performed.

Each of the above embodiments can be also applied to a locking system on any electronic equipment system irrespective of the kinds of electronic equipment and the number of equipment.

According to the first to tenth embodiments as described above, in the electronic equipment to/from which the extension device can be freely attached and detached, when the power supply is ON and the main body is driven, by locking the second locking mechanism, the extension device is disabled to be detached, and when the power supply is OFF and the main body is stopped, by releasing the second locking mechanism, the first locking mechanism is released and the extension device can be freely disconnected. There are advantages such that a breakdown and danger due to the removal of the connecting portions of the electronic equipment main body and the extension device can be prevented and a use efficiency is improved.

The MPU for power management is installed to each of the electronic equipment and the extension device which are separable. A fine control mechanism such that the power supply line is connected or disconnected by detecting the opening or closing of the open-close-lever and the ON/OFF state of the main body is transmitted to the extension device by the intercommunicating function of the MPUs and the second locking mechanism is activated or the like can be provided.

By displaying a message about permission or inhibition of the connection or disconnection between the electronic equipment and extension device to the display apparatus such as an LED or the like, the state of the electronic equipment can be safely and certainly informed to the user. A mechanism that is friendly to the user can be provided.

By providing a plurality of sensors for the second locking mechanism, an effect of the locking state can be detected. By changing the sensing timing of the first locking mechanism, an accidental situation such that the power supply is shut off due to an unexpected temporary unlocking can be avoided. A safe mechanism can be provided.

An intelligent locking system for performing processes such as initialization of the locking, retrying, error process, and the like can be provided in response to the detection of the sensor.

What is claimed is:

1. An electronic equipment to/from which an extension device for extending a function can be freely attached and detached, comprising:

connecting means for mechanically connecting said extension device to a main body of said electronic equipment;

locking means for locking a release of the connecting of said connecting means;

switching means for indicating supply/stop of a power supply to said main body; and release indicating means for, when a supply of the power supply is indicated by said switching means, indicating a release of the connecting of said extension device, and wherein at the time of indicating a stop of the power supply by said switching means when the release of the connecting of said extension device is indicated by said release indicating means, a locking of said locking means is released.

2. An equipment according to claim 1, further comprising communicating means, for transmitting information to drive said extension device in an interlocked relation with driving of said electronic equipment, from said electronic equipment to said extension device.

3. An equipment according to claim 1, wherein a power supply line between said electronic equipment and said extension device is electronically connected and disconnected by an operation of said connecting means.

4. An equipment according to claim 1, further comprising:

a first sensor for detecting a state of connection of said connecting means;

a second sensor for detecting a state of the locking of said locking means, stopping means for, when a state of disconnecting of said connecting means is detected by said first sensor, stopping a supply of the power supply, and inhibiting means for inhibiting said stopping means, when a state of the locking of said locking means is detected by said second sensor.

5. An equipment according to claim 4, wherein when said locking means is in a locking state at the time of the power ON, locking is released.

6. An equipment according to claim 4, wherein when the locking is not locked within a predetermined time after said locking means is activated, a driving torque is raised and said locking means is again activated.

7. An equipment according to claim 6, wherein when the locking is not locked even after a re-activation of said locking means is performed a predetermined number of times, it is determined and indicated that said locking means or said sensor is failed.

8. An equipment according to claim 6, wherein the re-activation of said locking means is executed by raising the driving torque step by step.

9. An equipment according to claim 1, wherein when said electronic equipment is solely driven without attaching said extension device, said locking means is locked.

10. An equipment according to claim 1, wherein said connecting means has a lever for locking, and said locking means latches said lever.

11. An equipment according to claim 10, wherein said locking means rotates a gear by a motor, thereby locking said connecting means.

12. An equipment according to claim 1, wherein said connecting means comprises a first member and a movable second member.

13. An equipment according to claim 12, further comprising second connecting means formed in the vicinity of said second member, for electrically connecting said main body and said extension device.

14. An equipment according to claim 12, further comprising a recess portion formed on a back surface of said main body, for coming into engagement with said first member and said second member.

15. An electronic equipment system, comprising:

electronic equipment having a main body;

an extension device attachable to said electronic equipment;

connecting means for mechanically connecting said extension device to said main body of said electronic equipment;

locking means for locking a release of said connecting means;

switching means for indicating supply/stop of a power supply to said main body; and release indicating means for, when a supply of the power supply is indicated by said switching means, indicating a release of the connecting of said extension device, and wherein at the time of indicating a stop of the power supply by said switching means, and at the time of indicating a supply of the power supply by said switching means when the release of the connecting of said extension device is indicated by said release indicating means, a locking of said locking means is released.

16. A system according to claim 15, further comprising communicating means, for transmitting information to drive said extension device in an interlocked relation with driving of said electronic equipment, from said electronic equipment to said extension device.

17. A system according to claim 15, wherein a power supply line between said electronic equipment and said extension device is electronically connected and disconnected by an operation of said connecting means.

18. A system according to claim 15, further comprising:

a first sensor for detecting a state of connection of said connecting means a second sensor for detecting a state of the locking of said locking means, stopping means for, when a state of disconnecting of said connecting means is detected by said first sensor, stopping a supply of the power supply, and inhibiting means for inhibiting said stopping means, when a state of the locking of said locking means is detected by said second sensor.

19. A system according to claim 18, wherein when said locking means is in a locking state at the time of the power ON, locking is released.

20. A system according to claim 18, wherein when the locking is not locked within a predetermined time after said locking means is activated, a driving torque is raised and said locking means is again activated.

21. A system according to claim 20, wherein when the locking is not locked even after a reactivation of said locking means is performed a predetermined number of times, it is determined and indicated that said locking means or said sensor is failed.

22. A system according to claim 20, wherein the re-activation of said locking means is executed by raising the driving torque step by step.

23. A system according to claim 15, wherein when said electronic equipment is solely driven without attaching said extension device, said locking means is locked.

24. A system according to claim 15, wherein said connecting means has a lever for locking, and said locking means latches said lever.

25. A system according to claim 24, wherein said locking means rotates a gear by a motor, thereby locking said connecting means.

26. A system according to claim 15, wherein said connecting means comprises a first member and a movable second member.

27. A system according to claim 26, further comprising second connecting means formed in the vicinity of said second member, for electrically connecting said main body and said extension device.

28. A system according to claim 26, further comprising a recess portion formed on a back surface of said main body, for coming into engagement with said first member and said second member.

* * * * *

UNITED STATES PATENT AND TRADEMARK OFFICE
CERTIFICATE OF CORRECTION

PATENT NO. : 6,119,184

DATED : September 12, 2000

INVENTOR(S): SHINICHIRO TAKAHAMA

It is certified that error appears in the above-identified patent and that said Letters Patent is hereby corrected as shown below:

COLUMN 12:

Line 12, "the" should read --a--.

COLUMN 13:

Line 23, "the" should read --a--.

Signed and Sealed this

Eighth Day of May, 2001

Attest:

NICHOLAS P. GODICI

Attesting Officer        Acting Director of the United States Patent and Trademark Office